US008177488B2

(12) United States Patent
Manteiga et al.

(10) Patent No.: US 8,177,488 B2
(45) Date of Patent: May 15, 2012

(54) INTEGRATED SERVICE TUBE AND IMPINGEMENT BAFFLE FOR A GAS TURBINE ENGINE

(75) Inventors: John Alan Manteiga, North Andover, MA (US); Robert John Parks, Ipswich, MA (US)

(73) Assignee: General Electric Company, Schenectady, NY (US)

( * ) Notice: Subject to any disclaimer, the term of this patent is extended or adjusted under 35 U.S.C. 154(b) by 733 days.

(21) Appl. No.: 12/325,175

(22) Filed: Nov. 29, 2008

(65) Prior Publication Data

US 2010/0135786 A1 Jun. 3, 2010

(51) Int. Cl.
*F03D 11/00* (2006.01)
*F01D 1/00* (2006.01)

(52) U.S. Cl. ........ 415/142; 415/108; 415/136; 415/138; 415/180; 415/182.1; 415/220

(58) Field of Classification Search .................. 415/220, 415/180, 142, 108, 136, 138, 182.1
See application file for complete search history.

(56) References Cited

U.S. PATENT DOCUMENTS 2,961,150 A 11/1960 Pirtle
4,203,719 A * 5/1980 Brandt .......................... 431/352
4,369,016 A 1/1983 Dennison
5,080,555 A 1/1992 Kempinger
5,272,869 A 12/1993 Dawson et al.
5,284,011 A 2/1994 Von Benken
5,292,227 A 3/1994 Czachor et al.
5,356,264 A 10/1994 Watson et al.
5,357,744 A 10/1994 Czachor et al.
5,438,756 A 8/1995 Halchak et al.
5,483,792 A 1/1996 Czachor et al.
5,634,767 A 6/1997 Dawson
5,851,105 A 12/1998 Fric et al.
6,102,577 A 8/2000 Tremaine
6,267,553 B1 * 7/2001 Burge ........................... 415/115
6,358,001 B1 3/2002 Bosel et al.
6,439,841 B1 8/2002 Bosel
6,447,248 B1 9/2002 Kastl et al.
6,612,807 B2 9/2003 Czachor
6,672,833 B2 1/2004 MacLean et al.
6,708,482 B2 3/2004 Seda
6,796,765 B2 9/2004 Kosel et al.
6,860,716 B2 3/2005 Czachor et al.

(Continued)

FOREIGN PATENT DOCUMENTS

EP 0315486 A2 5/1989
EP 1149987 A2 10/2001
EP 1621734 A1 2/2006
FR 1325291 A 4/1963

OTHER PUBLICATIONS

PCT International Search Report and Written Opinion issued in connection with corresponding application No. PCT/US2009/055147 dated Feb. 10, 2011.

*Primary Examiner* — Michelle Mandala
(74) *Attorney, Agent, or Firm* — David J. Clement, Esq.; Trego, Hines & Ladenheim, PLLC

(57) ABSTRACT

A service tube apparatus for a gas turbine engine includes a service tube assembly having: (a) an elongated, hollow service tube; and (b) a service tube baffle surrounding the service tube which is pierced with a plurality of impingement cooling holes.

18 Claims, 9 Drawing Sheets

U.S. PATENT DOCUMENTS

| | | | |
|---|---|---|---|
| 6,883,303 | B1 | 4/2005 | Seda |
| 6,935,837 | B2 | 8/2005 | Moniz et al. |
| 6,983,608 | B2 | 1/2006 | Allen, Jr. et al. |
| 7,353,647 | B2 | 4/2008 | Orlando et al. |
| 2007/0217911 | A1 | 9/2007 | Cameriano et al. |
| 2008/0232953 | A1 | 9/2008 | Gumbard et al. |

* cited by examiner

INTEGRATED SERVICE TUBE AND IMPINGEMENT BAFFLE FOR A GAS TURBINE ENGINE

BACKGROUND OF THE INVENTION

This invention relates generally to gas turbine engine turbines and more particularly to structural members of such engines.

Gas turbine engines frequently include a stationary turbine frame (also referred to as an inter-turbine frame or turbine center frame) which provides a structural load path from bearings which support the rotating shafts of the engine to an outer casing, which forms a backbone structure of the engine. Turbine frames commonly include an annular, centrally-located hub surrounded by an annular outer ring, which are interconnected by a plurality of radially-extending struts, as well as one or more service tubes which carry fluids to and from the hub. The turbine frame crosses the combustion gas flowpath of the turbine and is thus exposed to high temperatures in operation.

From a thermodynamic standpoint it is desirable to increase operating temperatures within gas turbine engines as much as possible to increase both output and efficiency. However, as engine operating temperatures are increased, increased active cooling for turbine frame, turbine nozzle, and turbine blade components becomes necessary.

Conventional service tubes are mounted internal to the struts of the frame and are inseparable from the frame. High temperature operation tends to cause undesirable oil coking within the service tubes.

BRIEF SUMMARY OF THE INVENTION

These and other shortcomings of the prior art are addressed by the present invention, which provides a service tube assembly for a gas turbine engine that incorporates active cooling.

According to one aspect, a service tube apparatus for a gas turbine engine includes a service tube assembly including: (a) an elongated, hollow service tube; and (b) a service tube baffle surrounding the service tube which is pierced with a plurality of impingement cooling holes.

According to another aspect of the invention, a turbine frame assembly for a gas turbine engine includes: (a) a turbine frame including: (i) an outer ring; (ii) a hub; and (ii) a plurality of struts extending between the hub and the outer ring; (b) at least one service tube apparatus extending between the hub and the outer ring, comprising a service tube assembly including: (i) an elongated, hollow service tube; and (ii) a service tube baffle surrounding the service tube which is pierced with a plurality of impingement cooling holes.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
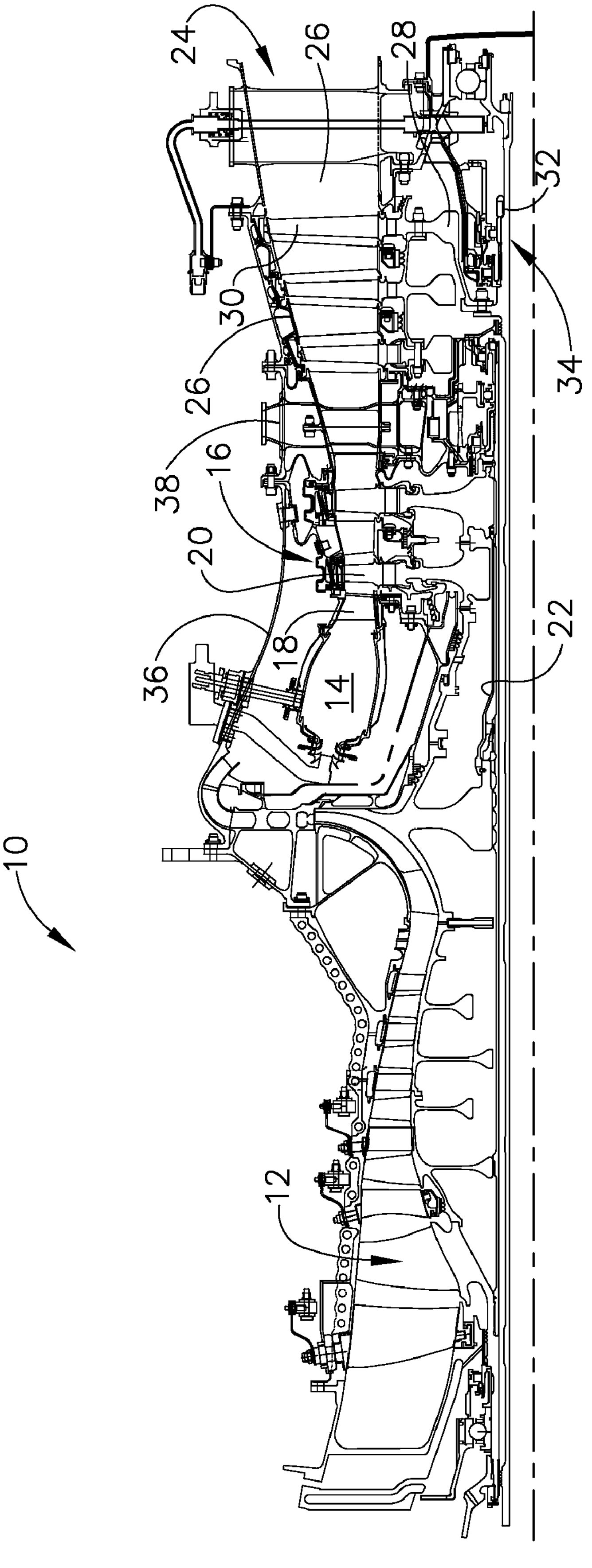
FIG. 1 a schematic half-sectional view of a gas turbine engine constructed in accordance with an aspect of the present invention.
Figure 2A:
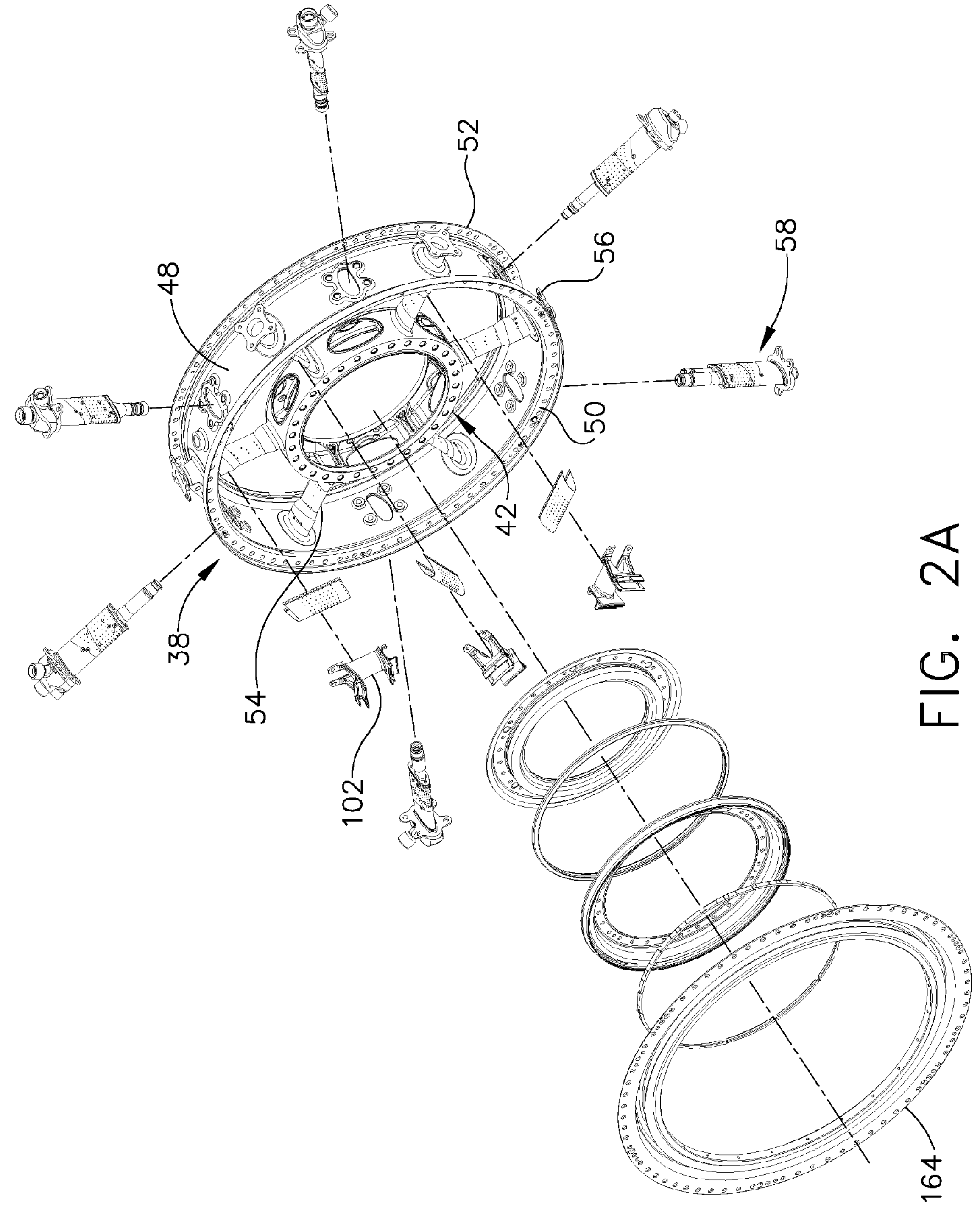
FIGS. 2A and 2B are an exploded perspective view of a turbine frame assembly of the gas turbine engine of FIG. 1.
Figure 2B:
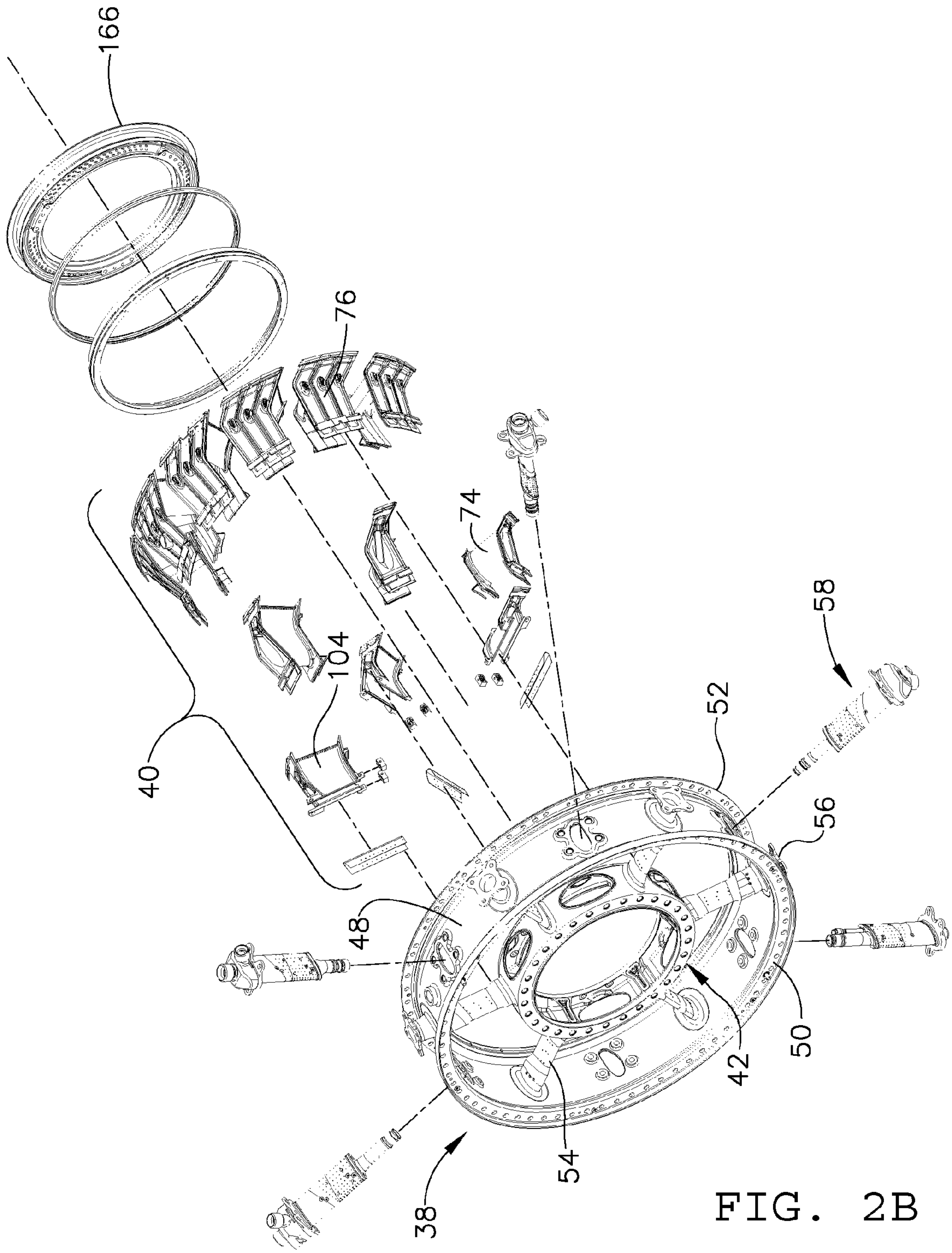

Referring to the drawings wherein identical reference numerals denote the same elements throughout the various views, FIGS. 1 and 2 depict a portion of a gas turbine engine 10 having, among other structures, a compressor 12, a combustor 14, and a gas generator turbine 16. In the illustrated example, the engine is a turboshaft engine. However, the principles described herein are equally applicable to turboprop, turbojet, and turbofan engines, as well as turbine engines used for other vehicles or in stationary applications.

The compressor 12 provides compressed air that passes into the combustor 14 where fuel is introduced and burned to generate hot combustion gases. The combustion gases are discharged to the gas generator turbine 16 which comprises alternating rows of stationary vanes or nozzles 18 and rotating blades or buckets 20. The combustion gases are expanded therein and energy is extracted to drive the compressor 12 through an outer shaft 22.

A work turbine 24 is disposed downstream of the gas generator turbine 16. It also comprises alternating rows of stationary vanes or nozzles 26 and rotors 28 carrying rotating blades or buckets 30. The work turbine 24 further expands the combustion gases and extracts energy to drive an external load (such as a propeller or gearbox) through an inner shaft 32.

The inner and outer shafts 32 and 22 are supported for rotation in one or more bearings 34. One or more turbine frames provide structural load paths from the bearings 34 to an outer casing 36, which forms a backbone structure of the engine 10. In particular, a turbine frame assembly, which comprises a turbine frame 38 that integrates a first stage nozzle cascade 40 of the work turbine 24, is disposed between the gas generator turbine 16 and the work turbine 24.

Figure 3A:
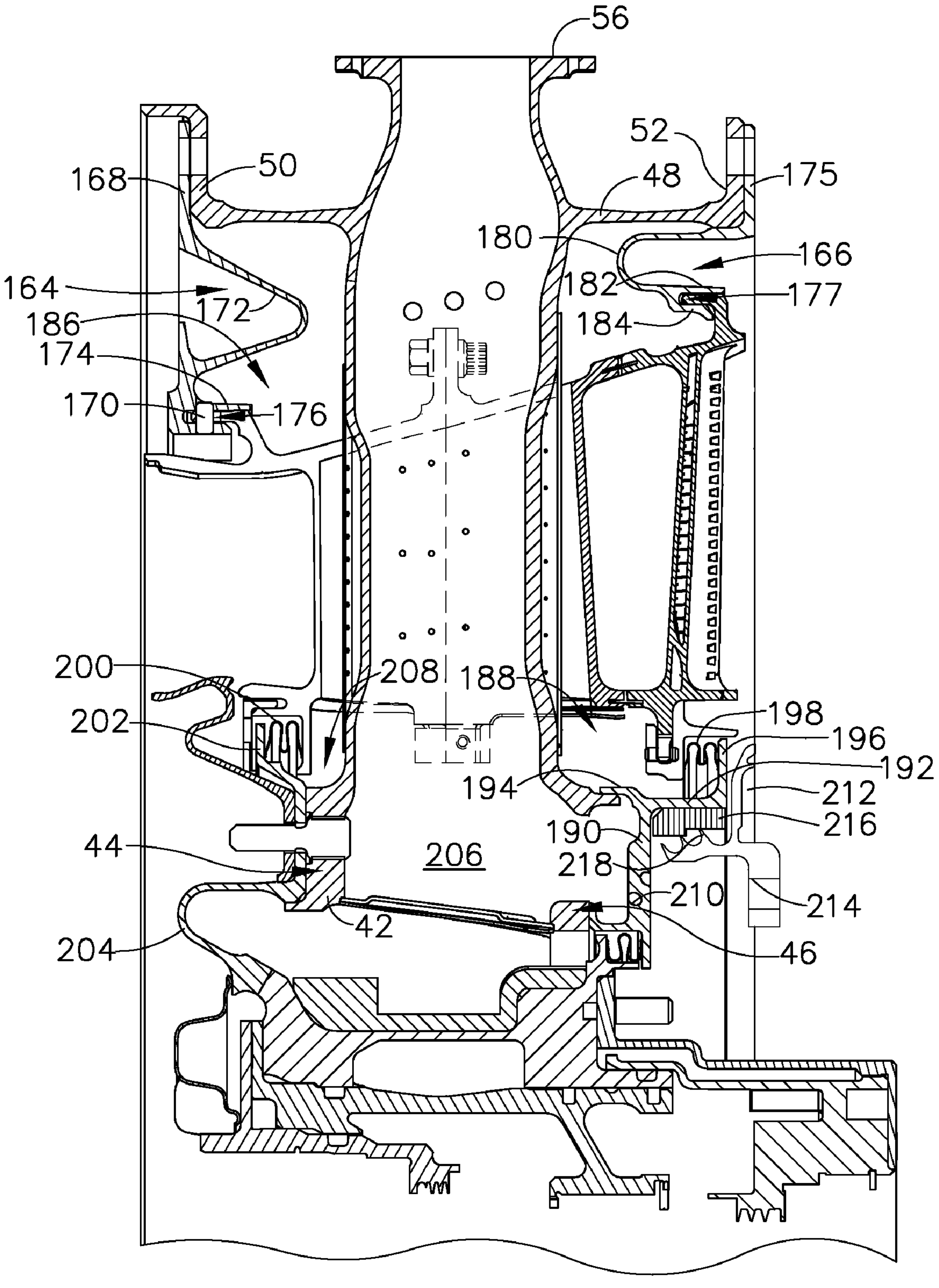
FIGS. 3A, 3B, and 3C are cross-sectional views of the turbine frame assembly of FIG. 2.
Figure 3B:
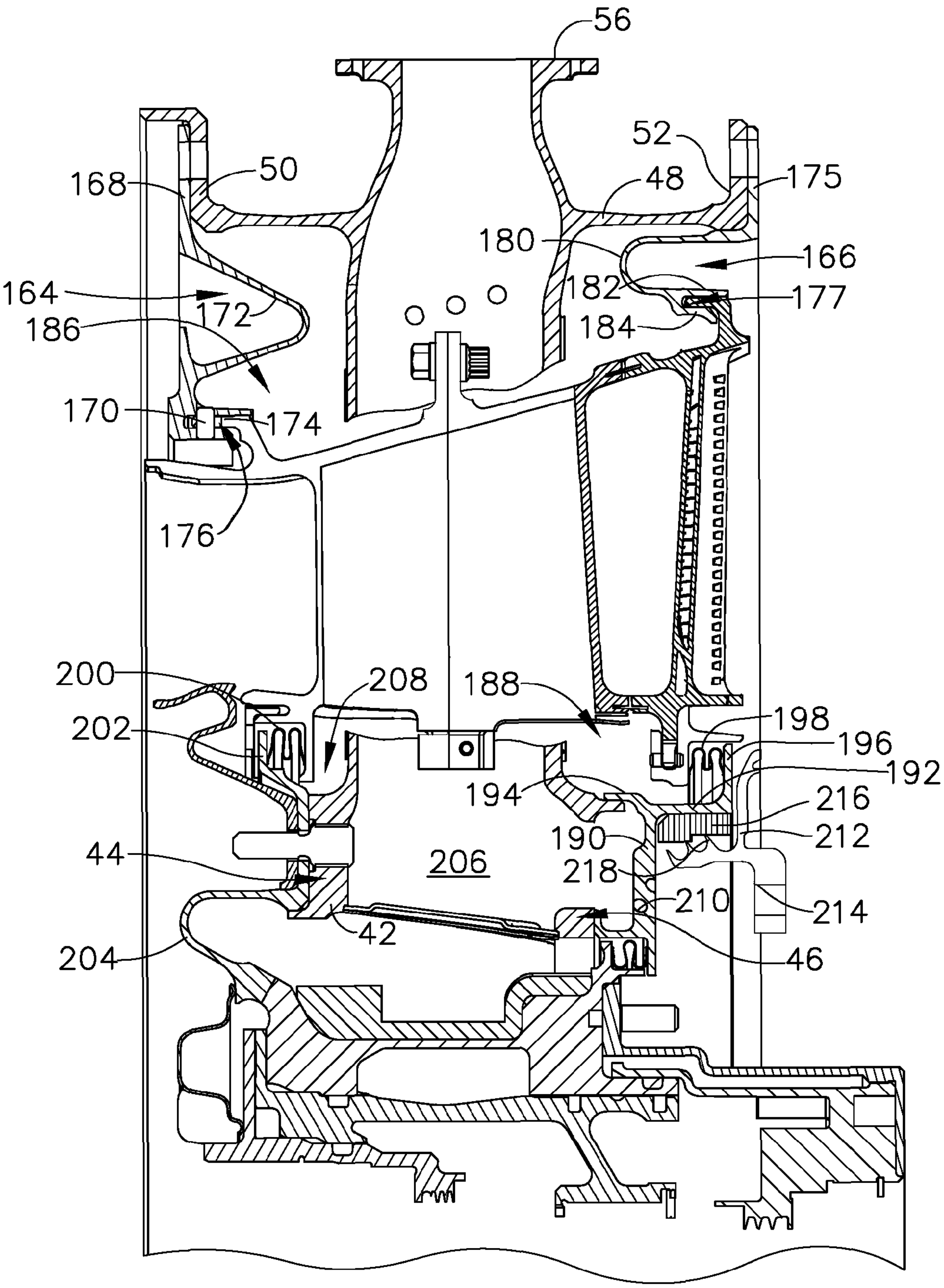
Figure 3C:
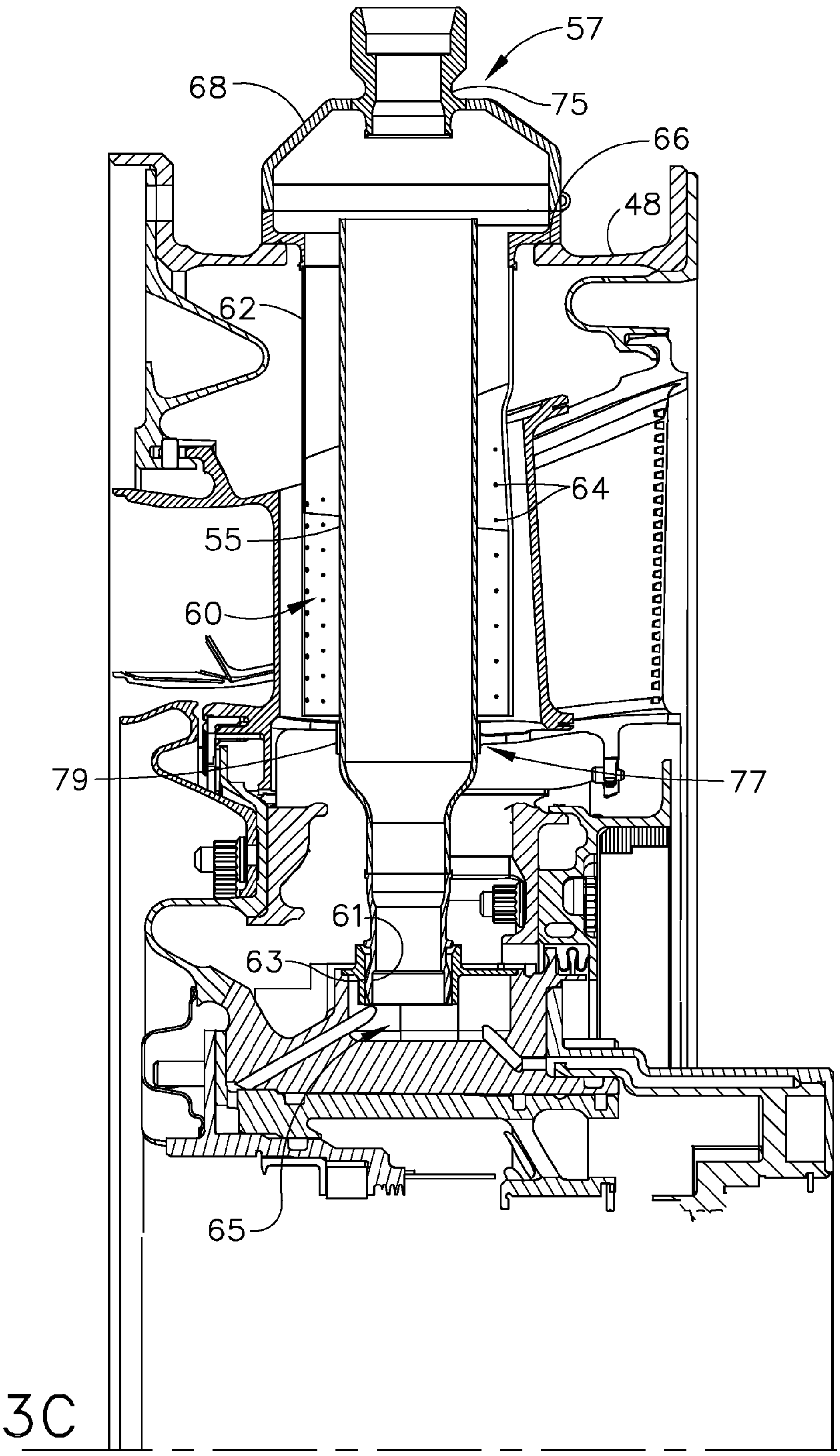
Figure 4:
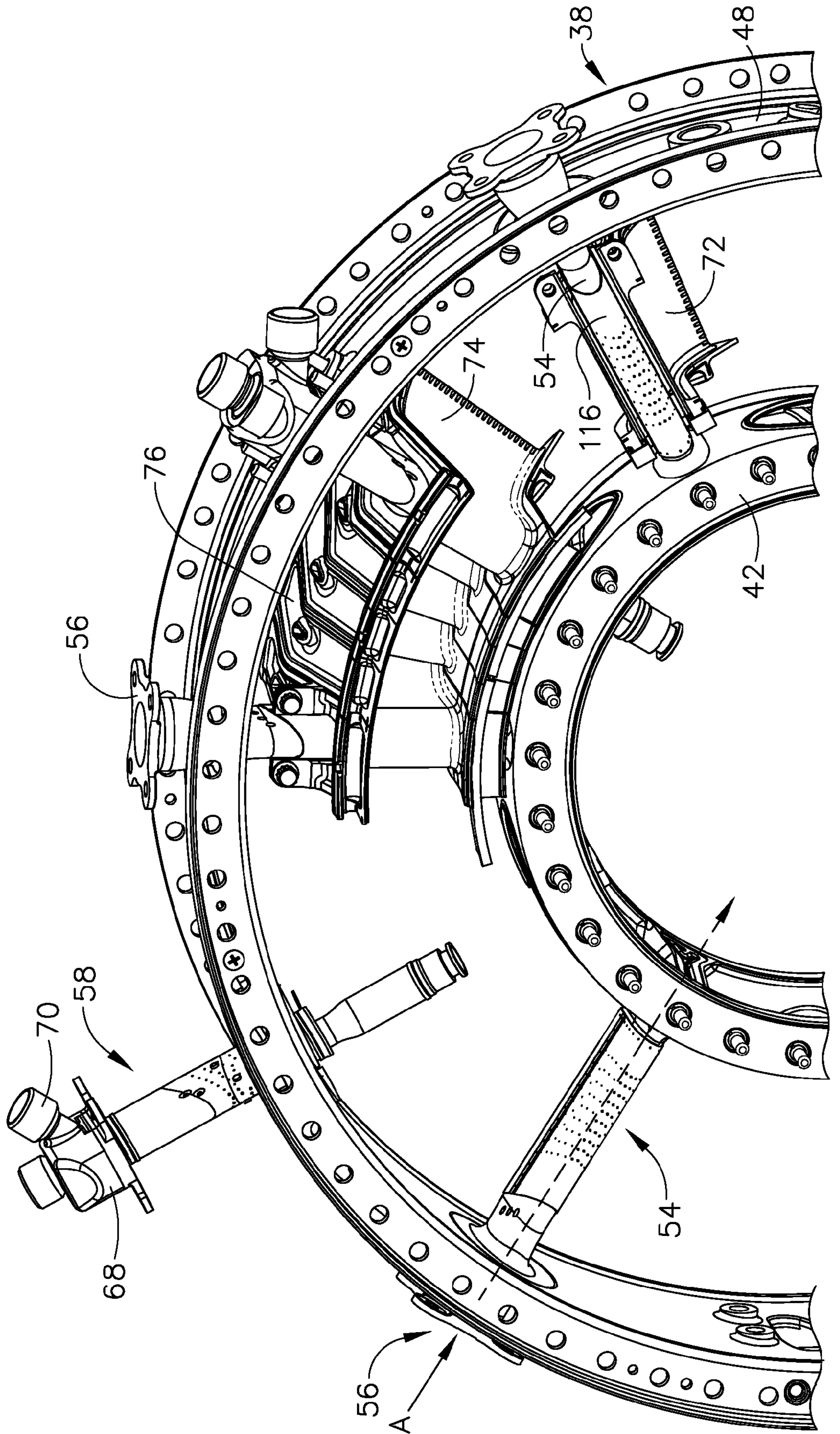
FIG. 4 is a perspective view of the turbine frame assembly in a partially-assembled condition.

FIGS. 2-4 illustrate the construction of the turbine frame assembly in more detail. The turbine frame 38 comprises an annular, centrally-located hub 42 with forward and aft faces 44 and 46, surrounded by an annular outer ring 48 having forward and aft flanges 50 and 52. The hub 42 and the outer ring 48 are interconnected by a plurality of radially-extending struts 54. In the illustrated example there are six equally-spaced struts 54. The turbine frame 38 may be a single integral unit or it may be built up from individual components. In the illustrated example it is cast in a single piece from a metal alloy suitable for high-temperature operation, such as a cobalt- or nickel-based "superalloy". An example of a suitable material is a nickel-based alloy commercially known as IN718. Each of the struts 54 is hollow and terminates in a bleed air port 56 at its outer end, outboard of the outer ring 48.

Figure 5:
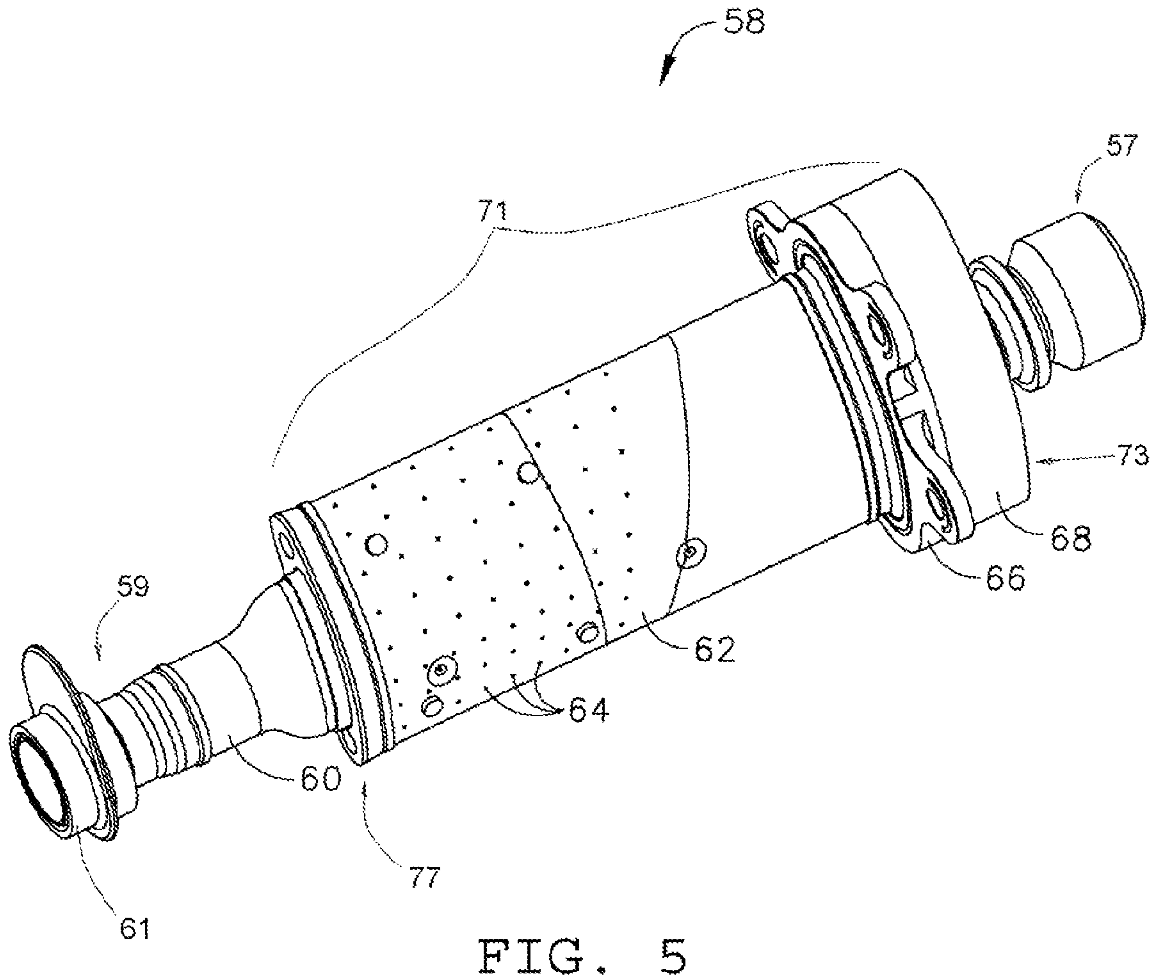
FIG. 5 is a perspective view of a service tube assembly constructed according to an aspect of the present invention.

A plurality of service tube assemblies 58 are mounted in the turbine frame 38, positioned between the struts 54, and extend between the outer ring 48 and the hub 42. In this example there are six service tube assemblies 58. FIGS. 3C and 5 show the service tube assembly in more detail. Each service tube assembly 58 includes a hollow service tube 60. The service tube 60 has a central section 55 disposed between reduced-diameter outer and inner ends 57 and 59. The inner end 59 includes a generally cylindrical male fitting 61 which forms a plug-in connection in cooperation with a female receptacle 63 of a sump 65 located within the turbine frame 38. The service tube 60 may be used to transport air or oil from between the sump 65 and an external conduit (not shown) such as an oil supply or scavenge line, or sump pressurization or vent line, which is coupled to the outer end 57.

The service tube 60 is surrounded by a hollow housing 71 which is an integral component that comprises a service tube baffle 62 pierced with impingement cooling holes 64, a mounting bracket 66, and a manifold 68 with an inlet tube 70. The outer end 73 of the housing 71 is attached to an annular flange 75 at the outer end 57 of the service tube 60, for example by brazing or welding. The inner end 77 of the housing 71 is free to move thermally in operation, and has an opening that closely surrounds the central section 55 so as to leave a small gap for cooling air flow, as explained in more detail below. The central section 55 may include an annular collar 79 about its outer periphery to define the gap in cooperation with the housing 71.

The service tube assemblies 58 plug into aligned openings in the outer ring 48 and the hub 42, and are secured to the outer ring 48 using bolts passing through the mounting bracket 66.

The nozzle cascade 40 comprises a plurality of actively-cooled airfoils. In this particular example there are 48 airfoils in total. This number may be varied to suit a particular application. Some of the airfoils, in this case 12, are axially elongated and are incorporated into fairings (see FIG. 4) which protect the struts 54 and service tube assemblies 58 from hot combustion gases. Some of the fairings, in this case 6, are strut fairings 72 which are of a split configuration. The remainder of the fairings are service tube fairings 74 which are a single piece configuration. The remaining airfoils, in this case 36, are arranged into nozzle segments 76 having one or more vanes each.

For the purposes of the present invention only the service tube fairings 74 will be described in detail. The other components of the nozzle cascade 40 are described in co-pending application by J. A. Manteiga et al. entitled "Turbine Frame Assembly and Method for a Gas Turbine Engine", which is which is incorporated herein by reference.

Figure 6:
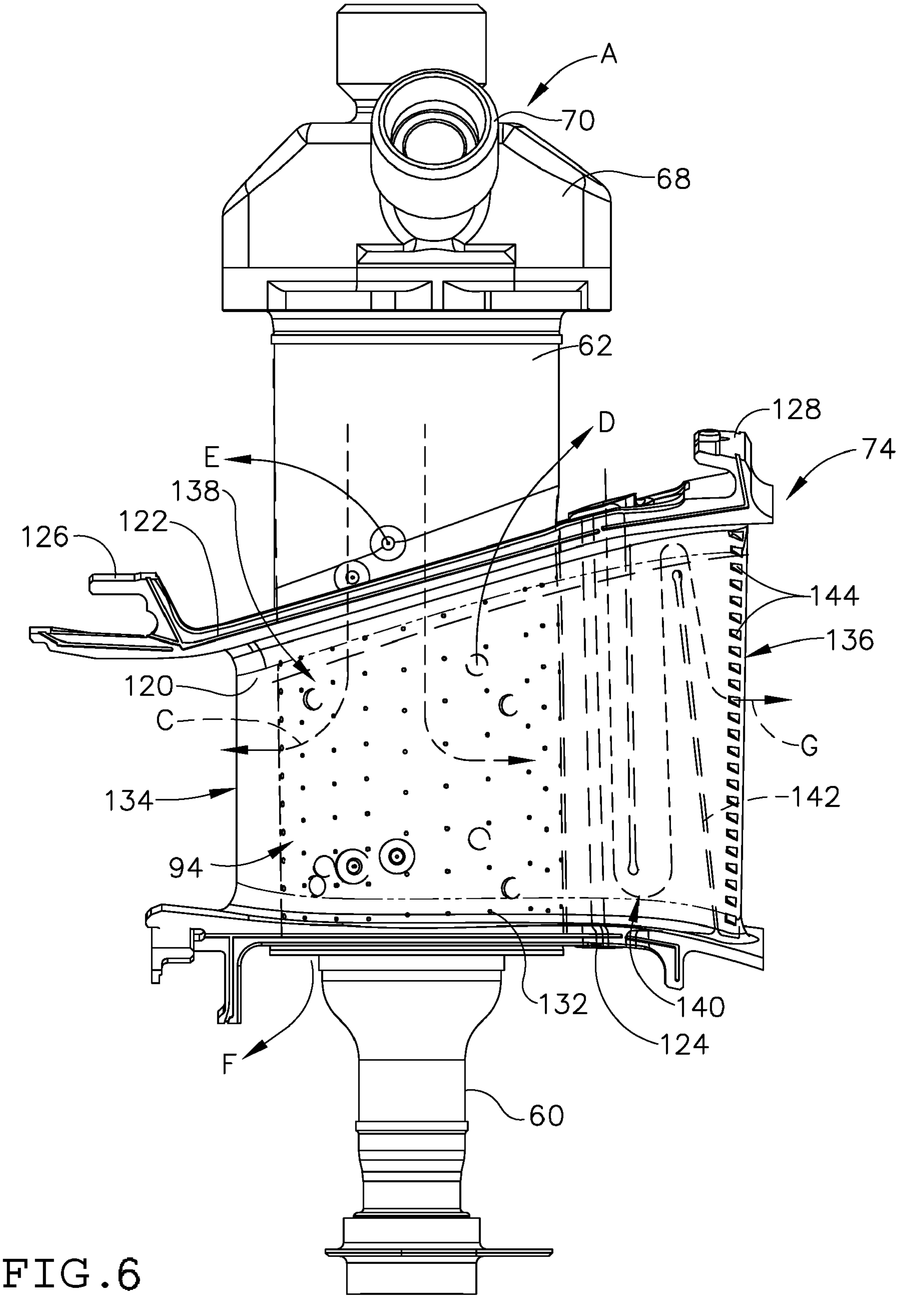
FIG. 6 is a side view of a service tube fairing.

FIG. 6 shows one of the service tube fairings 74 in more detail. It includes an airfoil-shaped hollow vane 120 that is supported between an arcuate outer band 122 and an arcuate inner band 124. The inner and outer bands 124 and 122 are axially elongated and shaped so that they define a portion of the flowpath through the turbine frame 38. A forward hook 126 protrudes axially forward from the outer face of the outer band 122, and an aft hook 128 protrudes axially forward from the outer face of the outer band 122. The vane 120 is axially elongated and includes spaced-apart sidewalls 132 extending between a leading edge 134 and a trailing edge 136. The sidewalls 132 are shaped so as to form an aerodynamic fairing for the service tube assembly 58. A forward section 138 of the vane 120 is hollow and is impingement cooled, in a manner described in more detail below. An aft section 140 of the vane 120 is also hollow and incorporates walls 142 that define a multiple-pass serpentine flowpath. A plurality of trailing edge passages 144, such as slots or holes, pass through the trailing edge 136 of each vane 120.

The service tube fairings 74 are cast from a metal alloy suitable for high-temperature operation, such as a cobalt- or nickel-based "superalloy", and may be cast with a specific crystal structure, such as directionally-solidified (DS) or single-crystal (SX), in a known manner. An example of one suitable material is a nickel-based alloy commercially known as RENE N4.

As shown in FIG. 2 and 3, the strut fairings 72, service tube fairings 74, and nozzle segments 76 are all supported by forward and aft hangers 164 and 166 which are fastened to the forward and aft flanges 50 and 52 of the turbine frame 38, respectively, for example using bolts or other suitable fasteners.

The forward nozzle hanger 164 is generally disk-shaped and includes an outer flange 168 and an inner flange 170, interconnected by an aft-extending arm 172 having a generally "V"-shaped cross-section. The inner flange 170 defines a mounting rail 174 with a slot 176 which accepts the forward hooks 126 of the service tube fairings 74 and similar hooks of the strut fairings 72 and nozzle segments 76. The outer flange 168 has bolt holes therein corresponding to bolt holes in the forward flange 50 of the turbine frame 38. The forward nozzle hanger 164 supports the nozzle cascade 40 radially in a way that allows compliance in the axial direction.

The aft nozzle hanger 166 is generally disk-shaped and includes an outer flange 175 and an inner flange 177, interconnected by forward-extending arm 180 having a generally "U"-shaped cross-section. The inner flange 177 defines a mounting rail 182 with a slot 184 which accepts the aft hooks 128 of the service tube fairings 74 and similar hooks of the strut fairings 72 and nozzle segments 76. The outer flange 175 has bolt holes therein corresponding to bolt holes in the aft flange 52 of the turbine frame 38. The aft nozzle hanger 166 supports the nozzle cascade 48 radially while providing restraint in the axial direction.

When assembled, the outer bands of the strut fairings 72, service tube fairings 74, and nozzle segments 76 cooperate with the outer ring 48 of the turbine frame 38 to define an annular outer band cavity 186 (see FIG. 3).

An annular outer balance piston (OPB) seal 188 is attached to the aft face of the hub 42, for example with bolts or other suitable fasteners. The OBP seal 188 has a generally "L"-shaped cross-section with a radial arm 190 and an axial arm 192. A forward sealing lip 194 bears against the hub 42, and an aft, radially-outwardly-extending sealing lip 196 captures an annular, "M"-shaped seal 198 against the nozzle cascade 40. A similar "M"-shaped seal 200 is captured between the forward end of the nozzle cascade 40 and another sealing lip 202 on an stationary engine structure 204. Collectively, the hub 42 and the OBP seal 188 define an inner manifold 206 which communicates with the interior of the hub 42. Also, the inner bands of the strut fairings 72, service tube fairings 74, and nozzle segments 76 cooperate with the hub 42 of the turbine frame 38, the OBP seal 188, and the seals 198 and 200 to define an annular inner band cavity 208. One or more cooling holes 210 pass through the radial arm 190 of the OBP seal 188. In operation, these cooling holes 210 pass cooling air from the hub 42 to an annular seal plate 212 mounted on a front face of the downstream rotor 28. The cooling air enters a hole 214 in the seal plate 212 and is then routed to the rotor 28 in a conventional fashion.

The axial arm 192 of the OBP seal 188 carries an abradable material 216 (such as a metallic honeycomb) which mates with a seal tooth 218 of the seal plate 212.

Referring to FIGS. 4 and 6, cooling of the service tube fairings 74 is as follows. Cooling air bled from a source such as the compressor 12 (see FIG. 1) is fed into the inlet tubes 70, as shown by the arrow "A".

One portion of this flow exits impingement cooling holes 64 in the service tube baffles 62 and is used for impingement cooling the service tube fairings 74, as shown by arrows "C" (see FIG. 6). After impingement cooling, the air passes to the outer band cavity 186, as shown at "D". Another portion of air exits the service tube baffles 62 and enters the outer band cavity 186 directly, as shown by arrows "E". Finally, a third portion of the air from the service tube baffles 62 exits the between the service tube baffle 62 and the service tube 60 and purges the inner band cavity 208 (see arrow "F").

Air from the outer band cavity 186, which is as combination of purge air and post-impingement flows denoted D and E in FIG. 6, enters the serpentine passages in the aft sections of the vanes 120 as shown at "G". It is then used therein for convective cooling in a conventional manner and subsequently exhausted through the trailing edge cooling passages.

The turbine frame assembly described above has multiple advantages over prior art designs. The engine 10 can run hotter and longer without oil coked sump services. The service tube assemblies 58 are "plug-in" components permitting inspection or cleaning without engine disassembly. Also, integration of the service tube and liner cooling improves packaging by moving the service tubes 60 away from the struts 54. There is a potential for less flowpath blockage and better engine performance than with conventional designs. Furthermore, this frees up the struts 54 for use in providing cooling air to downstream turbine rotors or other components.

The foregoing has described a turbine frame assembly for a gas turbine engine. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. A service tube apparatus for a gas turbine engine, comprising:
a service tube assembly including:
(a) an elongated, hollow service tube; and
(b) a hollow housing surrounding the service tube which includes:
(i) a manifold including an inlet tube;
(ii) a mounting bracket; and
(iii) a service tube baffle surrounding the service tube which is pierced with a plurality of impingement cooling holes.

2. The service tube apparatus of claim 1 wherein the housing is a single integral component.

3. The service tube apparatus of claim 1 wherein an outer end of the housing is rigidly connected to the service tube, and an inner end of the housing is free to move in a radial direction relative to the service tube.

4. The service tube apparatus of claim 3 wherein an annular gap is defined between an inner end of the housing and the service tube.

5. The service tube apparatus of claim 1 wherein the service tube includes inner and outer ends, the inner end terminating in a generally cylindrical male fitting.

6. The service tube apparatus of claim 5 wherein the service tube incorporates an enlarged-diameter central portion disposed between the inner and outer ends.

7. The service tube apparatus of claim 1 further including a service tube fairing surrounding the service tube assembly, the service tube fairing comprising:
(a) an arcuate outer band;
(b) an arcuate inner band; and
(c) an airfoil-shaped vane;
wherein the vane defines a continuous fairing around the service tube assembly.

8. The service tube apparatus of claim 7 wherein the vane of the service tube fairing includes walls defining a serpentine flow path therein, the serpentine flow path in fluid communication with at least one trailing edge passage disposed at a trailing edge of the vane.

9. A turbine frame assembly for a gas turbine engine, comprising:
(a) a turbine frame including:
(i) an outer ring;
(ii) a hub; and
(ii) a plurality of struts extending between the hub and the outer ring;
(b) at least one service tube apparatus extending between the hub and the outer ring, comprising a service tube assembly including:
(i) an elongated, hollow service tube; and
(ii) a hollow housing surrounding the service tube which includes:
(A) a manifold including an inlet tube;
(B) a mounting bracket; and
(C) a service tube baffle surrounding the service tube which is pierced with a plurality of impingement cooling holes.

10. The turbine frame assembly of claim 9 wherein the outer ring, the hub, and the struts are a single integral casting.

11. The turbine frame assembly of claim 9 wherein the housing is a single integral component.

12. The turbine frame assembly of claim 9 wherein an outer end of the housing is rigidly connected to the service tube, and an inner end of the housing is free to move in a radial direction relative to the service tube.

13. The turbine frame assembly of claim 12 wherein an annular gap is defined between an inner end of the housing and the service tube.

14. The turbine frame assembly of claim 9 wherein the service tube includes inner and outer ends, the inner end terminating in a generally cylindrical male fitting.

15. The turbine frame assembly of claim 14 wherein the service tube incorporates an enlarged-diameter central portion disposed between the inner and outer ends.

16. The turbine frame assembly of claim 9 further including a service tube fairing surrounding the service tube assembly, the service tube fairing comprising:
(a) an arcuate outer band;
(b) an arcuate inner band; and
(c) an airfoil-shaped vane, wherein the vane defines a continuous fairing around the service tube assembly.

17. The turbine frame assembly of claim 16 wherein the vane of the service tube fairing includes walls defining a serpentine flow path therein, the serpentine flow path in fluid communication with at least one trailing edge passage disposed at a trailing edge of the vane.

18. The turbine frame assembly of claim 9 wherein the service tube fairings are secured to the turbine frame by spaced-apart annular forward and aft nozzle hangers which engage the outer bands of the service tube fairings.

* * * * *